(No Model.)

F. H. RICHARDS.
WEIGHING MACHINE.

Patented July 6, 1897.

Fig. 1.

Witnesses
Chas. F. Schmelz
Fred. J. Dole.

Inventor
F. H. Richards.

Fig. 2.

(No Model.)

F. H. RICHARDS.
WEIGHING MACHINE.

No. 585,966. Patented July 6, 1897.

Witnesses
Chas. F. Schmelz
Fred. J. Dole.

Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,966, dated July 6, 1897.

Application filed November 14, 1896. Serial No. 612,110. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to machines for automatically weighing predetermined quantities of granular or other material, and it embodies means for controlling more perfectly the flow of the supply-stream and the discharge of the material from the load-receiver or bucket.
One of the main objects of my present invention is to provide, in connection with the valve mechanism or stream-controller of the machine, actuating means having variable efficiency gradually decreasing during the first part of the valve-actuating movement and progressively increasing during the remainder of such movement, so that the thrust transmitted by the stream-controller to the weighing mechanism with which it coöperates may be taken off gradually during that portion of the weighing operation in which the thrust of the valve tends to overpoise the load—that is to say, during the reducing and drip period of the closing movement of the stream-controller or valve—and a progressively-increasing force applied to the stream-controller or valve for closing the same during the cut-off period of the closing movement.

In a companion application filed by me October 30, 1896, Serial No. 610,610, I have illustrated a different form of valve-actuating means for a similar purpose.

Another feature of my invention is the provision of a valve having a plurality of superposed stream-controlling members or valve-pans so constructed and organized that a considerable portion of the force of the supply-stream is taken during the closing movement of the valve at a point or points nearer to the axis of movement of the valve than is possible by the use of a valve having a single stream-controlling pan.

It will be evident that the total resistance presented by the supply-stream to the closing of the valve is subdivided in such a manner that a considerable portion of the resistance is taken at a point or points relatively close to the axis of movement and that therefore less of the total resistance is effective at the maximum distance from the valve-axis and less of the total resistance is present to retard the closing movement of the valve.

In connection with the load-receiver of the weighing mechanism I prefer to employ a closer adapted to make a complete rotation about its axis, and one of the main features of this invention is the provision of such a closer having its axis transverse to the path of the material or load discharged from the bucket or receiver in which the load is made up. This closer preferably will be so constructed and organized with respect to the coöperative parts of the weighing mechanism that when it is released on the completion of a load it will be carried through a determined arc to its open position by the force of the discharged material and afterward will move through another and succeeding arc before it returns to its closed position.

In the drawings accompanying and forming part of this specification.

Similar characters designate like parts in all the figures of the drawings.

Figure 3:
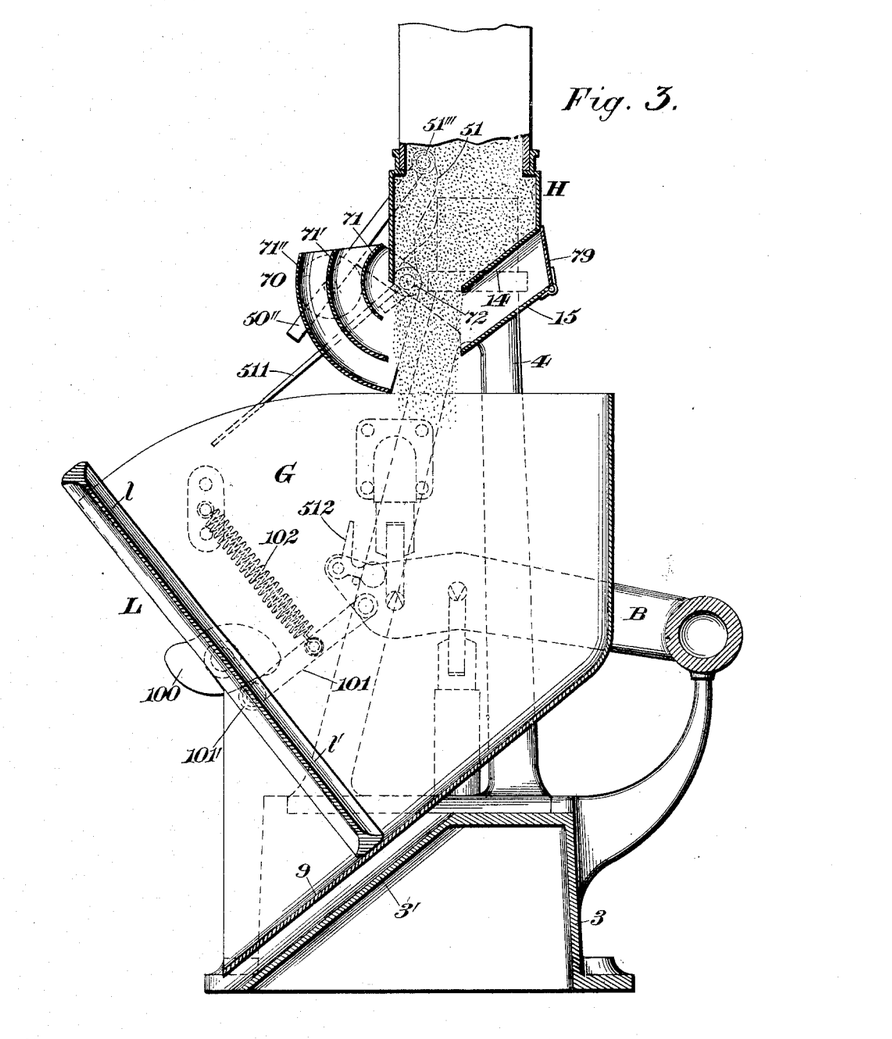
Fig. 3 is a vertical sectional side elevation of the same.

The framework of the machine comprises in the present case a base 3, carrying uprights or side frames 2 and 4, connected at their upper ends by the usual top plate or beam 5, on which is supported a hopper H for supplying material to the bucket. The base 3 is substantially a hollow or chambered member, but has a rear inclined wall 3' (see Fig. 3) to conform to the slope of the bottom of the load-receiver or bucket, (shown at G.)

This bucket may be mounted in the usual manner on the poising sides of the beam-arms of a beam mechanism, such as B, the bucket being supported by the usual knife-edge bearings on the beam mechanism and the beam mechanism supported on the base 3 by corresponding knife-edge bearings.

The bucket will be supported, preferably, at points substantially in the plane of the central vertical axis thereof and may be guided advantageously by means of an arm 12 and a link 13, which serve to prevent rocking of the bucket.

The load-receiver shown in the present application is in some respects different from those ordinarily employed for the same purpose, it having an open rear end and a sloping bottom 9, which bottom is substantially parallel with the sloping wall 3' of the base 3. The open rear end of the bucket is intended to be controlled by a rotary closer, which may be mounted between the side walls of the latter and preferably supported on the bucket and carried in bearings in the sides of the load-receiver. This closer, which is designated in a general way by L, is of duplex construction, it having to oppositely and symmetrically disposed members $l$ and $l'$, which are alternately effective, being operative in turn for closing the open rear end of the bucket and confining the material of the load while the charge is being made up in the bucket.

It will be noticed that the axis of rotation of this closer is transverse to the path of the material discharged from the bucket and that the closer itself is disposed at such an angle to the path of discharge of the load that on its release it will be partially rotated by the force of the down-flowing material, the axis of movement of the closer being at one side of the main portion of the load and above such path of discharge. After the closer has been partially opened by the force of the discharged material it may be carried through the remaining portion of its arc of movement by suitable actuating means, which will be hereinafter described.

The stream-controller which I prefer to employ for regulating the supply of material to the bucket is preferably oscillatory and is disposed with its axis of movement passing through the supply-stream. This valve, which is designated by 70, may have its shaft 72 supported in brackets 5', formed integral with the cross-piece 5, so that the discharge end of the valve and the mouth of the hopper will face each other.

The stream-controller illustrated herein is not, however, in the form of the usual stream-controlling valve having a single valve-pan, but instead has a plurality of superposed stream-controlling members or valve-pans, (designated, respectively, by 71, 71', and 71'',) these members being in this instance substantially parallel and concentric with the axis of oscillation passing through the shaft 72.

As the blade or pan 71 is nearer to the axis of movement than the pan 71' and as the latter is much closer to such axis than the lowermost valve-pan 71'', it will be evident that on the closing movement of the stream-controller the force of a considerable portion of the descending material of the supply-stream will be taken by the blades 71 and 71' and that when the discharge edges of these valve-pans are properly positioned the force of only a small portion of the material will be effective at the lowermost pan 71'', and hence the force of the greater portion and usually almost all of the supply-stream will be borne by the valve at a point or points less remote from the axis of oscillation than is the case usually and a less resistance will be opposed to the closing movement of the valve owing to this shortening of the radius of support of the material of the supply-stream.

It will be noted that the valve-pans 71, 71', and 71'' have their discharge edges in successive advanced positions, the lowermost one having its discharge edge in the most advanced position, thereby assuring that any material which flows over the edges of the upper two valve-pans will be received by the lowermost pan and will not flow off from the front edge of the latter.

In connection with the improved valve just described I prefer to employ a supply chute or spout having a plurality of superposed stream-supporting members or inclined walls, such as 14 and 15, coöperative with the several pans of the valve, the construction being such that one or more of the valve-pans will be movable in the space between the inclined walls 14 and 15 of the supply-spout and on the closing of the valve will carry a considerable portion of the material supported by the valve toward and into the space between the inclined walls 14 and 15 without moving the material to any considerable extent relatively to the valve. Moreover, it will be obvious that when a portion of the material is shifted forward into the space between the walls 14 and 15 that portion of the mass is relieved of much of the pressure of the material in the main chamber of the supply-spout, and at the same time the spaces between the valve-pans provide room for other portions of the material that otherwise would have to be forced back into the main portion of the supply-spout or into the space between the inclined walls 14 and 15. Hence it will be evident that the material, which with the ordinary construction of valve and supply-chute would be crowded back upon the main stream in opposition to the force of the latter, is so distributed by the currents diverging from a point slightly below and in advance of the axis of oscillation of the valve and tending to carry the surplus material into the pockets between the inclined walls of the chute and the superposed pans of the valve that the sliding movement of the valve-pans relatively to the material supported thereon is but slight and the force usually required in closing the valve to slide the material on the latter and overcome the friction of the mass is therefore unnecessary.

As before stated, I employ for the purpose of operating the stream-controller to close the same actuating means having a variable efficiency, progressively decreasing during the first part of the closing movement and correspondingly increasing during the latter portion of the closing period. This variation in efficiency will be such that the actuator will exert the minimum force at the moment or during the period when the load is poising and at that time, therefore, will transmit the minimum thrust to the weighing mechanism by which the load is being balanced.

For the purpose of properly regulating the force applied to the valve for closing the same I prefer to employ a variable-leverage actuator, which during a portion of such closing movement will have a progressively-varying leverage (in this case a progressively-decreasing one) and during the succeeding portion of such movement will have a progressively-variable increasing leverage. I obtain this result in the present instance by means of a counterweighted lever so connected with the valve that during the first part of the valve-closing movement the counterweight will exert its force through a portion of one quadrant of rotation and during the remainder of such closing movement of the valve will act through a portion of another quadrant of rotation, in which it will have an opposite but progressively-variable effect.

Figure 5:
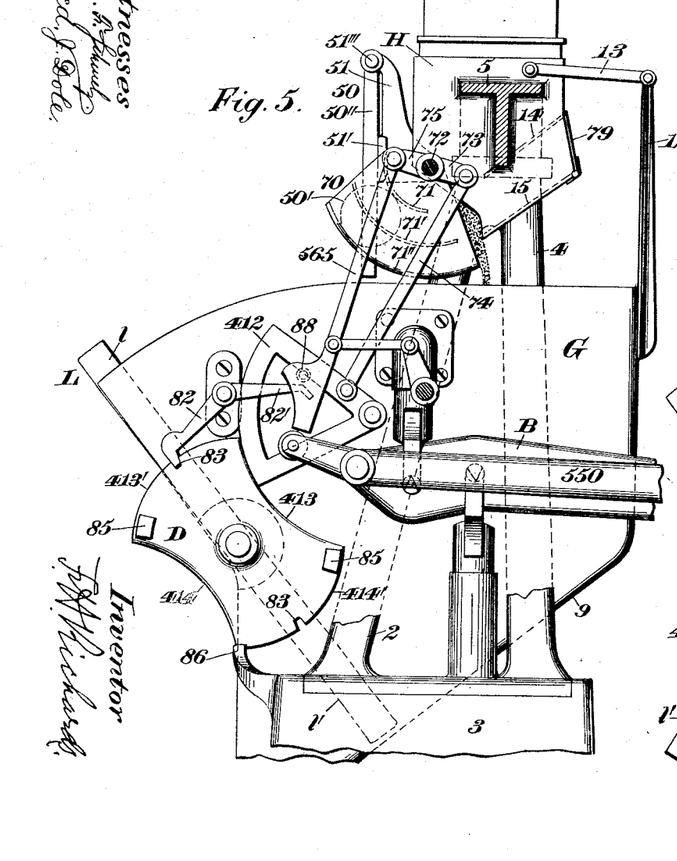
Figs. 5 and 6 are sectional side elevations corresponding to Fig. 2 and illustrate the positions of the parts during the drip period and on the opening of the closer, respectively.

An actuator capable of operation in the manner described in the foregoing paragraph is illustrated herein at 50, and it embodies as its essential feature a weight 50', which in the normal open position of the valve is substantially a part of the valve and acts as a counterweight therefor and which is so connected with the stream-controller that at a predetermined point in the closing movement thereof (in the present case at the beginning of the drip period) it will move relatively to the valve and will swing as a pendulous actuator from a point or arm in fixed relation with the valve. In the present instance an arm 51 projects from the shaft 72 of the valve and is pivotally connected with a swinging rod 50'', to the lower end of which the weight 50' is attached. The arm 51 on the valve-shaft has a stop-face 51', against which the forward side of the rod 50'' rests when the valve is in the normal open position, as shown, for instance, in Fig. 3. The arm 51, its stop-face, and the actuator 50 are so disposed relatively to each other and are at such an angle relatively to a perpendicular line passing through the axis of the valve 72 when these parts are in their normal positions that when the valve is closed the counterweight 50', forming part of the valve, will tend to move from the position shown in Fig. 3 to that illustrated in Fig. 5 through such an arc of the quadrant in which it is then operable as will bring the point of suspension of the weight and the center of gravity of the latter in a vertical line, it being effective during this period to impart a decreasingly-effective closing movement to the valve, while when the actuator arrives at the point in its movement which is indicated in Fig. 5 it will then fall away from the stop-face 51', and instead of being effective as a substantially rigid counterweighted portion of the valve its force will be transferred from the lower quadrant of movement to the upper quadrant and the weight will be hung from and become effective at the point of suspension 51''' to continue the closing movement of the valve with a progressively-increasing force or leverage, the rate of increase of which as compared with the rate of decrease in the lower quadrant will be dependent upon the length of the radius of leverage.

It will be evident that when the valve passes from its open position to the drip position the weight 50' will move from a point where it has a considerable force to one where its minimum force is present and that when said valve swings from the drip position to its shut position said weight moves from said point of minimum force to a point where its maximum efficiency is exhibited. In both of these movements of the actuator the fulcrum, or point at which the force of the actuator is exerted, remains the same; and the difference in the force of said actuator and in the direction of the variation of said force is obtained by providing an actuator having a changeable point of application of power, said point being transferred from its position in an arc of decreasing effect in one quadrant to an arc of increasing effect in another quadrant, although, of course, it will be obvious that whether the point of application of power be transferred to another quadrant or not is immaterial so long as the transference is to a point from which the actuator will have such an increasing effect.

For actuating the valve to open the same I may make use of the well-known form of counterweighted lever mounted on the beam mechanism and having its pivot on the poising side thereof. Such an actuator is represented herein at 550 and has an antifriction-roller at its inner end on which the lower end of the usual thrust-rod 565 may rest. This thrust-rod is pivotally connected at its upper end to a rock-arm 75, secured to the valve-shaft, while a second rock-arm, also secured to said shaft and illustrated at 73, is connected in a corresponding manner with a rod 74, pivoted to a swinging segment or stop 412 on the side of the bucket, this stop serving as a closer-rotation limiter for preventing rotation of the closer when the valve is open.

The coöperative means for correspondingly blocking the opening movement of the valve while the valve is open will in the present case comprise a pair of alternately effective valve-opening-movement limiters, and these may be formed as parts of a segmental disk (designated in a general way by D) having its axis coincident with that of the rotary closer L. It will be noticed that this disk has two oppositely-disposed convex faces, which are designated herein by 413' and 414', and two correspondingly-positioned concave faces, (indicated, respectively, by 413 and 414.) The concave faces are adapted to be engaged by the convex face of the stop 412, so as to prevent the opening of the closer while the valve is open, while the convex faces of the disk serve to prevent the unlocking of the stop 412 when the valve is closed. The stop-faces 413 and 413' are in this instance the blocking-faces of one stop, while the faces designated by 414 and 414' are the blocking-faces of another stop, and these two stops constitute alternately effective valve-opening-movement limiters, each stop coöperating in turn with that shown at 412.

Figure 4:
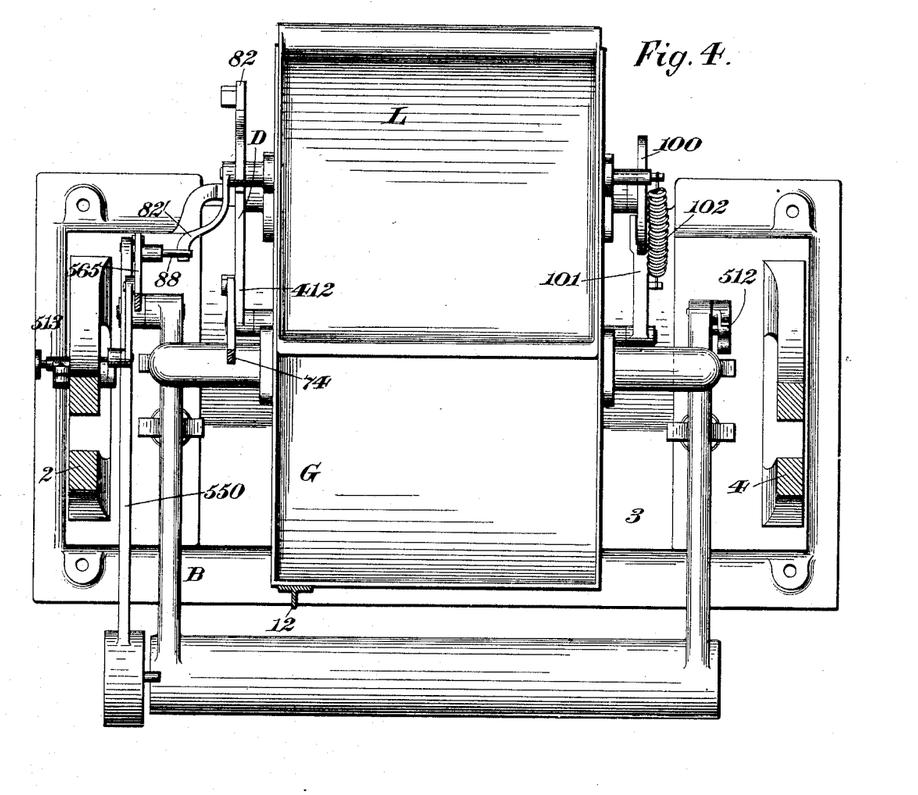
Fig. 4 is a sectional plan of the same, the section being taken in line 4 4, Fig. 2.

For the purpose of holding the closer in its shut position I provide holding means—such as a latch 82, of the usual construction—adapted to engage alternately-locking notches 83 in the convex portions of the disk D. This latch 82 has a forwardly-extending arm 82', by means of which the latch is tripped, the thrust-rod 565 being provided in the present case with tripping means—such as the pin 88, Fig. 4—for effecting the release of the latch.

When the load in the bucket is made up, the major portion of it is banked against the lower half of the closer, and hence tends to actuate the latter to open the same as soon as the closer is released by the latch 82. I prefer to provide suitable holding means, such as stops 85, on the disk D and a coöperative stop 86 on the base of the frame of the machine, by means of which, when the closer has been carried to its open position by the force of the downflowing material, it will be stopped at the end of a determined arc by the abutment of one of the stops 85 against that shown at 86. It will be noticed that this stopping of the rotation of the closer will be effected only when the bucket is down and has a considerable portion of the load therein. As soon as the bucket rises after discharging the load the stop 85 is withdrawn from engagement with that illustrated at 86, and thereupon the rotary movement of the closer may be continued through another determined arc (in this case through the remainder of a half-rotation or arc of one hundred and eighty degrees) to carry the closer to its shut position.

As a means for effecting this continued rotation I prefer to employ actuating devices in the form of a cam having its axis of movement coincident with that of the closer and a spring-operated arm in contact with the cam-face and adapted to exert a force sufficient to operate the closer. This cam is illustrated at 100 and has two similar halves, the cam-faces of which have corresponding efficiencies. The cam is so positioned that on the first opening movement of the closer, due to the force of the downflowing material of the load, the antifriction-roller 101' of the arm 101, which is pivoted on the side of the bucket, is carried from the lowest point of one of the cam-faces to the highest point of said face, so that when the stop 85 is released from the stop 86 this actuating-arm will be in position to exert its full force upon the next succeeding face of the cam and shut the closer. The spring for actuating the arm 101 is illustrated at 102 and may be a stiff helical spring having one end secured to the bucket and the other to the arm.

In addition to the members hereinbefore particularly described the usual drip-lever 511 and by-pass stop 512 are illustrated, also a crank-arm 513 and connections to the thrust-rod 565 for throwing the latter out of operative relation with the inner end of the counterweighted lever 550 when making a test. Moreover, a door, such as 79, may be pivoted to the supply-chute, so as to close the space between the stream-supporting walls 14 and 15, while permitting access to the space immediately above the valve.

Figure 1:
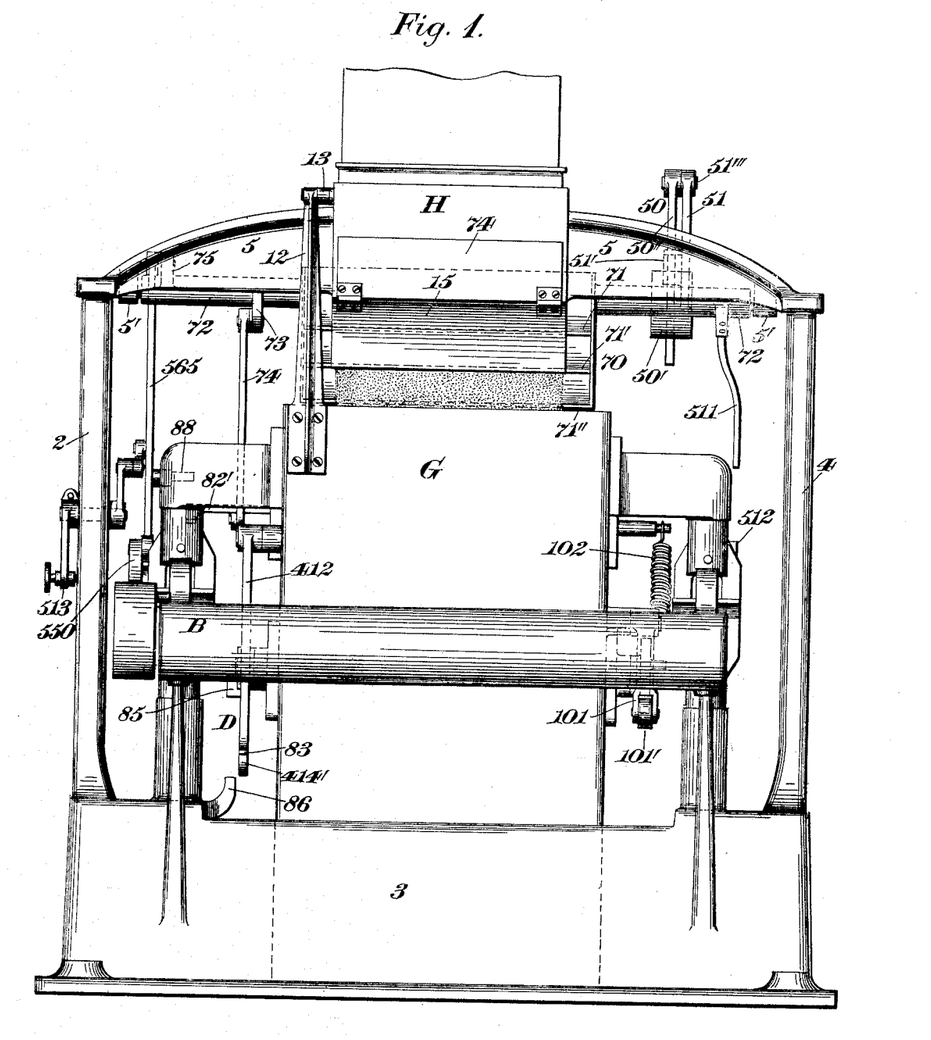
Figure 1 is a front elevation of a weighing-machine embodying my present improvements.
Figure 2:
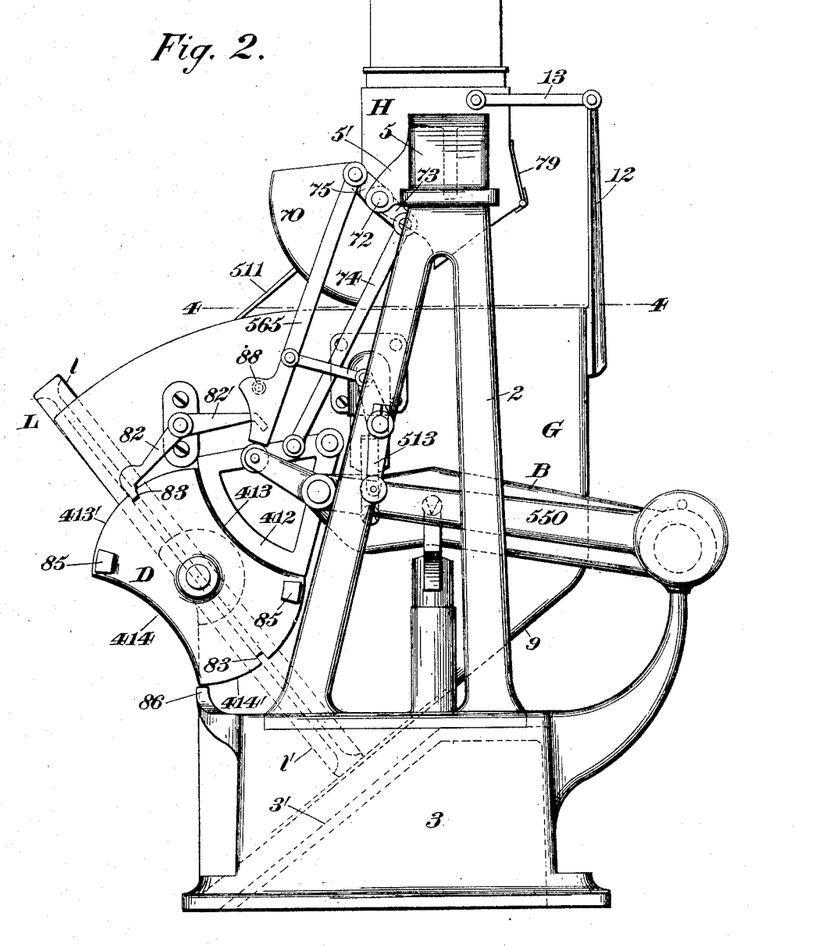
Fig. 2 is a side elevation of the same, looking from the left hand in Fig. 1 and shows the parts in position for supplying the full stream to the bucket.
Figure 6:
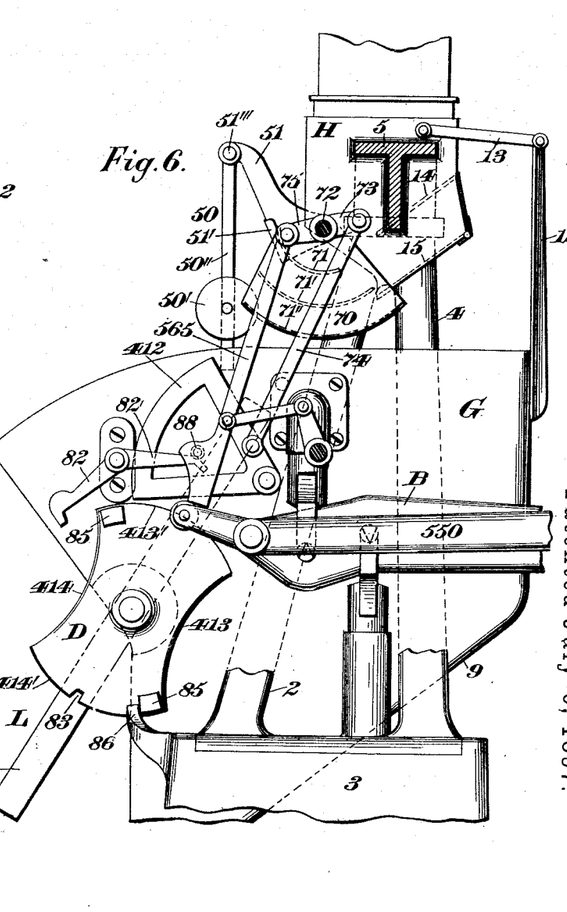
Figure 7:
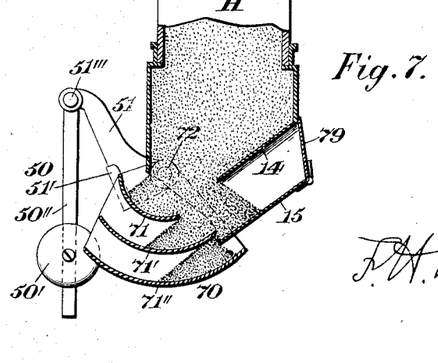
Fig. 7 is a detail sectional side elevation illustrating the supply-chute and the valve with the valve in its closed position.

The operation of a machine constructed in accordance with my present improvements is as follows: It being understood that the parts are in the positions shown in Fig. 2, with the valve wide open and delivering material into the bucket and with the stop 412 in position to block the rotation of the closer L, it will be seen that as soon as a sufficient portion of the load is made up the bucket will begin to descend and the valve will begin to close, the valve-closing actuator moving through an arc in which it will exert a progressively-decreasing leverage until the drip-lever 511 engages the stop 512 and is held thereby. During this period the stop 412 is partially withdrawn from engagement with the coöperating concave face of the stop-disk D. As soon as the full load is made up in the bucket by the drip-stream and the drip-lever 511 is released by the stop 512 the actuator 50 becomes effective about the point 51''' and exerts a progressively and rapidly increasing leverage upon the valve to close the same. The closing of the valve operates through connections 565 and 74 to withdraw the stop 412 from engagement with the corresponding stop on the disk D and trip the latch 82, whereupon the weight of the mass being discharged from the bucket carries the closer to the position shown in Fig. 6, where it is held by the abutment of the stop 85 against the stop 86 until substantially all of the load is discharged, one of the convex faces of the disk D being now operative to prevent the opening of the valve until the closer is shut again. On the ascent of the bucket the counterweighted lever 550 or valve-opening actuator is oscillated in the usual manner relatively to the beam mechanism, but does not actuate the valve until the stop on the disk is withdrawn from the stop 412 by the shutting of the closer. At this point the actuating-arm 101, which was put under tension by the partial opening of the closer on the discharge of the load, becomes effective to continue the rotation of said closer in the same direction and to carry the same through the remainder of an arc of one hundred and eighty degrees to its shut position, in which the other member thereof will be adjacent to the bottom of the bucket and will close the discharge end thereof. On the withdrawal of the stop on the disk from the stop 412, which, as before stated, is due to the shutting of the closer, the actuator 550 becomes effective to open the valve and the parts are restored to their normal positions for making up a new load.

Having described my invention, I claim—

1. The combination, with a stream-controller, of a variable-efficiency actuator therefor movable relatively to the stream-controller and having a progressively-decreasing efficiency during the first part of its working movement and a progressively-increasing efficiency during the remainder of said movement.

2. The combination, with a stream-controller, of a variable-force actuator therefor movable relatively to the stream-controller and having a progressively-decreasing force during the first part of its valve-actuating movement and a progressively-increasing force during the remainder of said movement.

3. The combination, with a stream-controller, of a variable-leverage actuator therefor movable relatively to the stream-controller and having a progressively-decreasing leverage during the first part of its valve-actuating movement and a progressively-increasing leverage during the remainder of said movement.

4. The combination, with a stream-controller having a two-period closing movement, of a variable-efficiency actuator therefor movable relatively to the stream-controller and having a progressively-decreasing efficiency during the first part of its closing movement and a progressively-increasing efficiency during the remainder of said movement.

5. The combination, with a stream-controller having a reducing movement, a drip period, and a cut-off movement, of a variable-force closing actuator therefor movable relatively to the stream-controller and having a progressively-decreasing force during the reducing movement of the stream-controller and a progressively-increasing force during the cut-off movement of said stream-controller.

6. The combination, with a stream-controller, of a variable-leverage actuator therefor having the first portion of its working movement in an arc of decreasing force and the succeeding portion of such movement in an arc of increasing force.

7. The combination, with a stream-controller, of a variable-leverage pendulous actuator therefor having the first portion of its working movement in an arc of decreasing force in one quadrant and the succeeding portion of such movement in an arc of increasing force in another quadrant.

8. The combination, with a stream-controller, of a variable-leverage actuator therefor having its point of application of power shiftable during its working movement from an arc of decreasing force in one quadrant to an arc of increasing force in another quadrant.

9. The combination, with a stream-controller, of a variable-leverage actuator therefor having its point of application of power shiftable during its working movement from an arc of decreasing force in one quadrant to an arc of increasing force in another quadrant and to a different distance from the fulcrum.

10. The combination, with an oscillatory valve of a variable-leverage valve-closing actuator supported on the valve during the first portion of the valve-closing movement and pivotally connected with the valve and oscillatory about such pivot relatively to the valve during the succeeding portion of its valve-closing movement.

11. The combination, with an oscillatory valve, of a variable-leverage valve-closing actuator supported on the valve below the axis of movement of the latter during the first portion of the valve-closing movement and pivotally connected with the valve above said axis and oscillatory about such pivot relatively to the valve during the succeeding portion of its valve-closing movement.

12. The combination, with stream-supplying means, of a valve having a plurality of superposed stream-controlling members fixed relatively to each other and movable across, and into and out of, the path of the supply-stream.

13. The combination, with stream-supplying means, of a valve having a plurality of superposed valve-pans fixed relatively to each other and movable across, and into and out of, the path of the supply-stream.

14. The combination, with stream-supplying means, of a valve having a plurality of substantially parallel superposed valve-pans fixed relatively to each other and movable across, and into and out of, the path of the supply-stream.

15. The combination, with stream-supplying means, of a valve having a plurality of substantially concentric superposed valve-pans fixed relatively to each other and movable across, and into and out of, the path of the supply-stream.

16. The combination, with stream-supplying means, of an oscillatory valve having a plurality of substantially parallel valve-pans fixed relatively to each other and movable across, and into and out of, the path of the supply-stream.

17. The combination, with stream-supplying means, of an oscillatory valve having a plurality of valve-pans substantially concentric with the axis of oscillation of the valve and fixed relatively to each other and movable across, and into and out of, the path of the supply-stream.

18. The combination, with stream-supplying means, of a valve oscillatory about an axis passing through the stream and having a plurality of substantially parallel valve-pans and fixed relatively to each other and movable across, and into and out of, the path of the supply-stream.

19. The combination, with stream-supplying means, of a valve embodying a plurality of superposed stream-supporting members the lowermost one of which has its discharge edge in the most advanced position.

20. The combination, with stream-supplying means, of a valve oscillatory about an axis passing through the stream and embodying a plurality of valve-pans substantially concentric with the axis of oscillation of the valve, the lowermost valve-pan having its discharge edge in the most advanced position.

21. The combination, with a supply-chute, of a valve having a plurality of superposed stream-supporting members coöperative with the chute to cut off the stream and in position to form, when the valve is closed, a relief-chamber adjacent to the discharge edge of the valve and at one side of the major portion of the mass supported thereon, for the reception of laterally-displaced material.

22. The combination, with a supply-chute having a pair of superposed stream-supporting members, of a valve having a valve-pan movable above, and adjacent to, the lower of said members of the chute.

23. The combination, with a supply-chute having a pair of superposed inclined stream-supporting members, of a valve having a valve-pan movable above, and adjacent to, the lower of said members of the chute.

24. The combination, with a supply-chute having a pair of superposed stream-supporting members the lower of which is substantially out of the path of the stream delivered from the chute, of a valve having a valve-pan movable above, and adjacent to, the lower of said members of the chute.

25. The combination, with a supply-chute having a plurality of superposed stream-supporting members, of a valve coöperative with said chute and having a plurality of superposed stream-controlling members fixed relatively to each other.

26. The combination, with a supply-chute having a plurality of superposed stream-supporting members, of an oscillatory valve coöperative with said chute and having a plurality of valve-pans substantially concentric with the axis of oscillation of the valve.

27. The combination, with a load-receiver, having a discharge-opening of a rotary closer therefor filling said opening and operative by the load through a determined arc on the release of said closer; auxiliary actuating mechanism for continuing the rotation of said closer through a determined arc; and closer-holding means.

28. The combination, with a load-receiver, having a discharge-opening of a duplex rotary closer having alternately-effective members for closing and opening and operative by the load through a portion of a half-rotation on the release of said closer; auxiliary actuating mechanism for continuing the movement of said closer through the remainder of said half-rotation; and closer-holding means for locking the closer in its shut position at the end of each half-rotation.

29. The combination, with a load-receiver, having a discharge-opening of a duplex rotary closer having alternately-effective members for closing and opening and operative by the load through a portion of a half-rotation on the release of said closer; auxiliary actuating mechanism for continuing the movement of said closer through the remainder of said half-rotation; closer-holding means for locking the closer in its shut position at the end of each half-rotation; and tripping means for releasing said holding means.

30. The combination, with a load-receiver, of a duplex rotary closer having alternately-effective members and operative by the load through a portion of a half-rotation on the release of said closer; actuating means for continuing the movement of said closer through the remainder of said half-rotation; a pair of oppositely-disposed stops carried by the closer and equidistant from the axis thereof; a latch for engaging said stops alternately; and latch-tripping means.

31. The combination, with a load-receiver, having a discharge-opening of a rotary closer therefor filling said opening and operative by the load through a determined arc on the release of said closer; spring-operated actuating means for continuing the rotation of said closer through a determined arc; and closer-holding means.

32. The combination, with a load-receiver, having a discharge-opening of a rotary closer therefor filling said opening and operative by the load through a determined arc on the release of said closer; a cam in fixed relation with the closer and having its axis of movement coincident with that of the closer; a spring-operated actuator coöperative with said cam, for continuing the rotation of said closer through a determined arc; and closer-holding means.

33. The combination, with a load-receiver, of a duplex rotary closer supported on said load-receiver and having alternately-effective members and operative by the load through a portion of a half-rotation on the release of said closer; a pair of oppositely-disposed stops equidistant from the axis of the closer; a stop on the frame for engaging said stops on the closer alternately to hold the closer in its respective open positions; actuating means for continuing the movement of said closer through the remainder of each half-rotation; a pair of oppositely-disposed stops equidistant from the axis of the closer and between the stops of said first-mentioned pair; and means for engaging said last-mentioned stops alternately to hold the closer in its shut position.

34. In a weighing mechanism, the combination, with stream-supplying means, of a stream-controlling valve; valve-actuating means for opening and closing the valve; a load-receiver having a discharge-opening; a rotary closer filling the opening in said load-receiver; a pair of valve-opening-movement limiters operative with the closer and effective, respectively, during the weighing of alternate loads; and a closer-rotation limiter operative with the valve and coöperative with the valve-opening-movement limiters alternately.

35. The combination, with a load-receiver, having a discharge-opening of a rotary closer therefor filling said opening and operative by the load through a determined arc on the release of said closer; means for holding the closer in its open position; auxiliary actuating mechanism for continuing the rotation of said closer, to shut the same on the discharge of the load from the receiver; and closer-holding means for locking the closer in its shut position.

36. The combination, with a load-receiver, having a discharge-opening of a rotary closer therefor filling said opening and operative by the load through a determined arc on the release of said closer; means for holding the closer in its open position on the release of the same and for releasing the closer on the ascent of the load-receiver; auxiliary actuating mechanism for continuing the rotation of said closer, to shut the same on the ascent of the load-receiver; and closer-holding means for locking the closer in its shut position.

37. The combination, with a load-receiver, having a discharge-opening of a duplex rotary closer therefor having alternately-effective members for closing and opening and operative by the load through a portion of a half-rotation on the release of said closer; means for holding the closer in either of its open positions; auxiliary actuating mechanism for continuing the movement of said closer through the remainder of said half-rotation; and closer-holding means for locking the closer in either of its shut positions at the end of such half-rotation.

38. The combination, with stream-supplying means, of a stream-controlling valve; means for opening and closing the valve; a load-receiver; a rotary closer for the load-receiver; a pair of oppositely-disposed, alternately-effective, valve-opening-movement limiters operative with the closer and located at opposite sides of the axis of rotation of the closer; and a closer-rotation limiter operative with the valve and coöperative with said valve-opening-movement limiters alternately.

FRANCIS H. RICHARDS.

Witnesses:
 FRED. J. DOLE,
 GEO. A. HOFFMAN.